United States Patent [19]

Heye

[11] Patent Number: 5,299,840

[45] Date of Patent: Apr. 5, 1994

[54] IN-LINE PRESSURE BALANCED UNIVERSAL EXPANSION JOINT

[75] Inventor: Donald R. Heye, San Diego, Calif.

[73] Assignee: Hyspan Precision Products, Inc., Chula Vista, Calif.

[21] Appl. No.: 65,542

[22] Filed: May 20, 1993

[51] Int. Cl.[5] .............................................. F16L 35/00
[52] U.S. Cl. .................................... 285/114; 285/227
[58] Field of Search .............. 285/114, 265, 226, 227, 285/228, 229, 299; 138/120

[56] References Cited

U.S. PATENT DOCUMENTS

| | | | |
|---|---|---|---|
| 2,314,776 | 3/1943 | Dittus et al. | 285/90 |
| 2,568,923 | 9/1951 | McNeary et al. | 285/90 |
| 2,661,963 | 12/1953 | Brown et al. | 285/90 |
| 2,822,193 | 2/1958 | Wiethüchter et al. | 285/114 |
| 4,865,298 | 9/1989 | Jordan | 285/226 X |
| 5,248,170 | 9/1993 | Francis | 285/114 |

FOREIGN PATENT DOCUMENTS

| | | | |
|---|---|---|---|
| 1089225 | 9/1960 | Fed. Rep. of Germany . | |
| 1218821 | 6/1966 | Fed. Rep. of Germany . | |
| 516188 | 4/1921 | France | 285/227 |
| 1146661 | 11/1957 | France . | |
| 1205263 | 2/1960 | France . | |
| 584129 | 1/1947 | United Kingdom . | |
| 2042115 | 9/1980 | United Kingdom . | |

OTHER PUBLICATIONS

*Russian Engineering Journal*, vol. LV, No. 1, 1975, pp. 23–25.
*Hyspan Precision Products Brochure*, 1983, p. 8.

Primary Examiner—Dave W. Arola
Attorney, Agent, or Firm—Brown, Martin, Haller & McClain

[57] ABSTRACT

An in-line, pressure balanced universal expansion joint for a piping system has a central bellows and opposite first and second end bellows secured to the opposite first and second ends of the central bellows. A first gimbal assembly pivotally links the outer end of the first end bellows to the second end of the central bellows. A second gimbal assembly links the outer end of the second end bellows to the first end of the central bellows. Each gimbal assembly has a gimbal ring pivotally linked to the outer end of the respective end bellows via a first linkage and to the respective end of the central bellows via a second linkage for pivotal movement about two perpendicular pivot axes.

6 Claims, 2 Drawing Sheets

IN-LINE PRESSURE BALANCED UNIVERSAL EXPANSION JOINT

BACKGROUND OF THE INVENTION

The present invention relates generally to expansion joints for pipelines to compensate for thermal expansion, pressure differentials and lateral movement.

Bellows-type expansion joints are commonly used in the chemical, oil, power and other industries involving extensive piping systems, in order to absorb axial and lateral movements without transmitting excessive thrust to the piping. One known bellows-type expansion joint comprises two outer or end bellows of equal diameter and a central balance bellows of larger diameter than the end bellows. Each outer bellows is connected to the central bellows by tie rods. Under pressure from the medium in the pipes, thrust forces develop in the flexible bellows elements. The forces in the outer and central bellows act in opposite directions, so that it is possible to balance the forces in the expansion joint. Since the bellows are connected by tie rods or fixed bars, which must remain parallel, any angulation in one bellows as a result of lateral movement of the adjacent pipe will be transmitted to the tied bellows. This results in transmission of high forces to the piping system, low bellows lifetime, and restricted total offset capability as a result of the risk of shearing the bellows.

In U.S. patent application Ser. No. 07/874,410 of Francis, filed Apr. 27, 1992, now U.S. Pat. No. 5,248,170 issued Sep. 28, 1993, an expansion joint is described in which opposite ends of the central bellows tied to the respective opposite end bellows by link members which are pivotally secured to the outer ends of the end bellows and tied rigidly to the ends of the central bellows. This allows the end bellows to angulate but prevents transmission of the angulation to the central bellows. This leaves the central bellows free to perform its main function of allowing the expansion joint to absorb axial displacement without transmitting thrust loads to the system. However, this joint allows angulation about one axis only, and thus will absorb lateral offsets in one axis or plane only.

SUMMARY OF THE INVENTION

It is an object of the present invention to provide a new and improved pressure balanced expansion joint which can absorb total lateral offset in any axis.

According to the present invention, an expansion joint for a piping system is provided which comprises a central bellows or expandable tubular member having opposite first and second ends, a first end bellows or expandable member connected to the first end of the central bellows, a second end bellows or expandable tubular member connected to the second end of the central bellows, each end bellows having an outer end adapted for connection to a section of piping in the piping system, a first gimbal assembly pivotally linking the outer end of the first end bellows to the second end of the central bellows, and a second gimbal assembly pivotally linking the outer end of the second end bellows to the first end of the central bellows. Each gimbal assembly comprises a gimbal ring surrounding the respective end bellows, a first linkage pivotally linking the gimbal ring to the outer end of the respective end bellows, and a second linkage pivotally linking the gimbal ring to the respective end of the central bellows, the first and second linkage having perpendicular pivot axes.

With this arrangement, the outer ends of the end or line bellows are free to rotate independently about two axes, and lateral offsets in any direction can be absorbed by angulation of the end bellows about the pivot axes. This provides a universal expansion joint which can absorb lateral offsets in any angular orientation. Since the end bellows can angulate independently of the central bellows, any lateral offset motion can be absorbed without angulating the central bellows, leaving the central bellows free to perform its main function of allowing the expansion joint to absorb axial displacements without transmitting pressure loads to the piping system, regardless of any lateral offsets. Any angulation of an end ring of an end bellows will only be imposed on the end bellows adjacent that ring.

In a preferred embodiment of the invention, the first linkage of each gimbal assembly comprises a pair of diametrically opposed first tie rods extending on opposite sides of the respective end bellows between the respective gimbal ring and the respective outer end of the end bellows, and the second linkage comprises a pair of diametrically opposed second tie rods extending on opposite sides of the joint in a plane perpendicular to the plane of the first tie rods between the respective gimbal ring and the respective end of the central bellows. Each first tie rod is pivotally connected at one end to the respective bellows and rigidly secured at the opposite end to the outer end of the respective end bellows. Each second tie rod is pivotally connected at one end to the respective gimbal ring and rigidly secured at the opposite end to the respective end of the central bellows. The second tie rods of the first gimbal assembly are preferably arranged in a plane perpendicular to the plane of the second tie rods of the second gimbal assembly, so that these four tie rods are arranged at 90° intervals about the periphery of the joint and can articulate without interfering with one another.

A linking mechanism is provided between the opposite ends of the central bellows to hold the ends parallel, so that the central bellows cannot angulate. In the preferred embodiment of the invention, the central bellows has enlarged first and second end rings or flanges at its first and second ends. The first end ring has a first pair of diametrically opposed slots through which the second tie rods of the first gimbal assembly slidably extend, while the second end ring has a second pair of diametrically opposed slots in a plane perpendicular to the plane of the first pair of opposed slots, through which the second tie rods of the second gimbal assembly slidably extend. Thus, any angulation of the second tie rods will result in corresponding angulation of the first and second end plates of the central bellows, with the end plates remaining parallel and concentric to their shared axes. The central bellows itself will not be angulated, and will be able to absorb axial displacements readily.

This expansion joint will absorb the total lateral offset about two perpendicular axes in a similar manner to a universal expansion joint, by angulating each end bellows while maintaining the opposite ends of the central bellows parallel to one another. Thus, the ability of the central bellows to absorb axial displacement is not affected regardless of any lateral offsets, and large thrust loads will not be transmitted to the piping system. This results in lower forces being transmitted to the system, higher cycle life, since a single end bellows can easily absorb any angular displacements, and greater total offset capability, since there will be essentially no danger of shearing the bellows.

BRIEF DESCRIPTION OF THE DRAWINGS

The present invention will be better understood from the following detailed description of a preferred embodiment of the invention, taken in conjunction with the accompanying drawings, in which like reference numerals refer like parts, and in which.

DESCRIPTION OF THE PREFERRED EMBODIMENT

Figure 1:
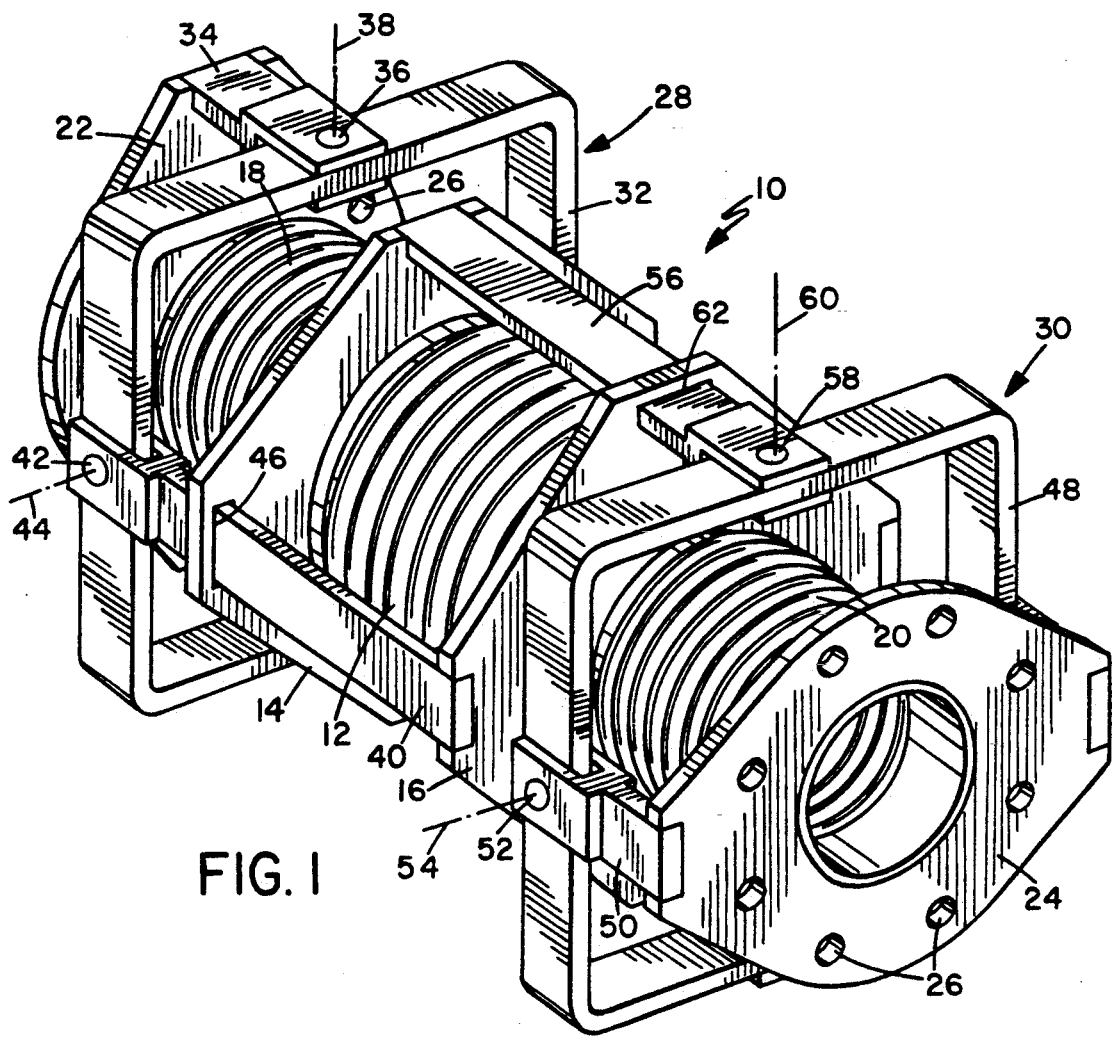
FIG. 1 is a perspective view of an expansion joint incorporating the gimballed supporting structure according to a preferred embodiment of the invention.
Figure 2:
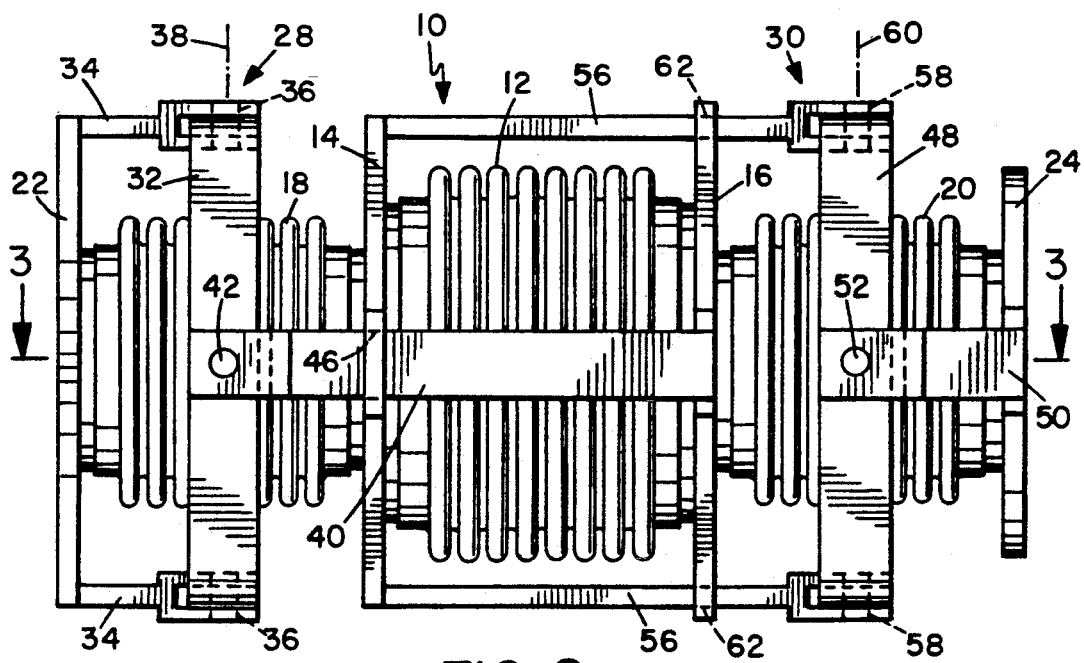
FIG. 2 is a side elevation view of the structure.
Figure 3:
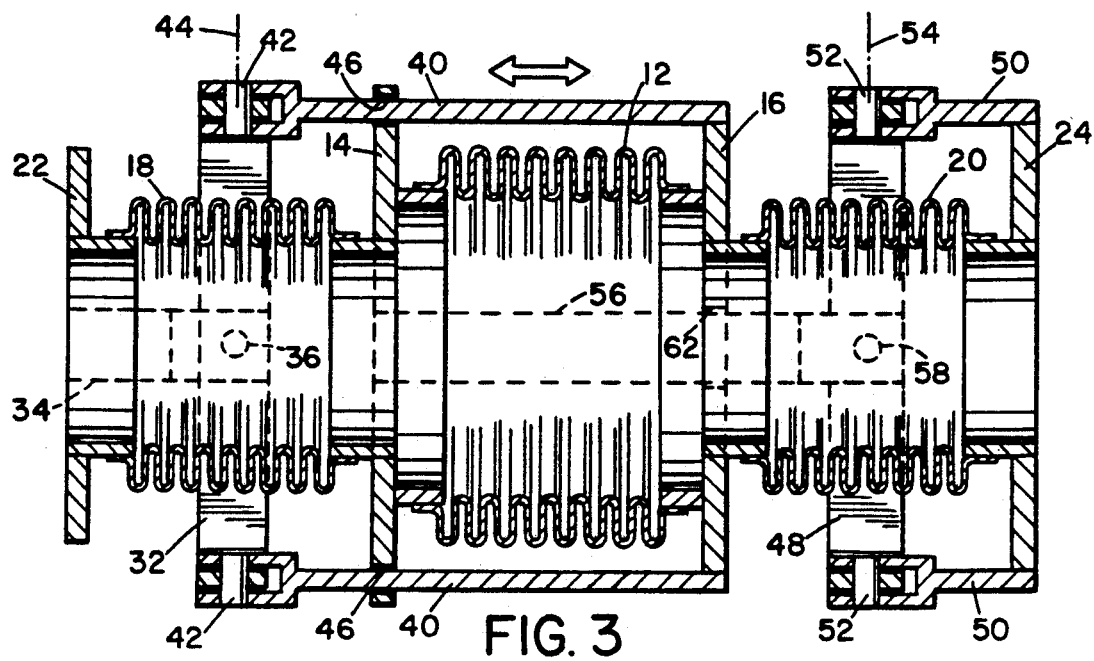
FIG. 3 is a sectional view taken on line 3-3 of FIG. 2.

FIGS. 1-3 of the drawings illustrate a universal, in-line, pressure balanced expansion joint 10 according to a preferred embodiment of the present invention. The joint 10 basically comprises a central or balance bellows 12 having enlarged first and second end rings or flanges 14, 16 at its opposite first and second ends, and opposite first and second end or line bellows 18, 20 arranged in line with the central bellows 12 and connected to its opposite first and second ends. Although bellows elements are used as the expandable elements in the illustrated embodiment, clearly other types of expandable and contractible tubular members may be used in alternative embodiments of the invention.

Each end bellows 18, 20 has an end ring 22, 24 respectively at its outer end which is adapted for connection to an adjacent piping section in a piping system in a conventional manner via bolt holes 26, or alternatively by welded pipe ends. A first gimbal assembly 28 pivotally links the end ring or flange 22 of the first end bellows to the second end ring 16 of the central bellows. A second gimbal assembly 30 pivotally links the end ring or flange 24 of the second end bellows to the first end ring 14 of the central bellows.

The first gimbal assembly 28 includes a gimbal ring 32 which surrounds the first end bellows 18 and is pivotally linked to the outer end ring 22 of bellows 18 via a first pair of diametrically opposed tie rods 34. Each tie rod is rigidly connected at one end to the end ring 22, and pivotally connected at the opposite end to the gimbal ring via pivot pin 36, to allow relative rotational movement between the gimbal ring 32 and the end ring 22 about a first pivot axis 38. The gimbal ring 32 is also pivotally linked to the second end ring 16 of the central bellows via a second pair of diametrically opposed tie rods 40 which extend in a plane perpendicular to the plane of the first pair of tie rods 34, as illustrated in FIGS. 1 and 2. Each tie rod 40 is rigidly connected at one end to the end ring 16 of the central bellows, and is pivotally connected at the opposite end to the gimbal ring via pivot pin 42, to allow relative rotational movement between the gimbal ring and end ring 16 about a second pivot axis 44 perpendicular to the first pivot axis 38. The tie rods 40 extend slidably through a pair of diametrically opposed slots 46 in the first end ring 14 of the central bellows with sufficient free play to allow relative sliding axial movement between the end ring 14 and tie rods 40, as best illustrated in FIG. 3.

Similarly, the second gimbal assembly 30 includes a gimbal ring 48 which is pivotally connected to the outer end ring 24 of the second end bellows 20 via a first pair of diametrically opposed tie rods 50, which are aligned with the second pair of tie rods 40 of the first gimbal assembly. Each tie rod 50 is rigidly secured to end ring 24 and pivotally connected to the gimbal ring 48 via pivot pin 52 for relative rotational movement about a first pivot axis 54. Pivot axis 54 is parallel to the second pivot axis 44 of the first gimbal assembly and perpendicular to the first pivot axis 38 of the first gimbal assembly.

The gimbal ring 48 is also pivotally connected to the first end ring 14 of the central bellows via a second pair of diametrically opposed tie rods 56, which are aligned with the first pair of tie rods 34 of the first gimbal assembly. Tie rods 56 hence lie in a plane perpendicular to the plane of the first pair of tie rods 50. Each tie rod 56 is rigidly secured to the end ring 14 at one end and pivotally connected at the opposite end to the gimbal ring 48 via pivot pin 58 for relative rotational movement about a second pivot axis 60 perpendicular to the first pivot axis 54. At the same time, pivot axis 60 is parallel to the first pivot axis 38 of the first gimbal assembly. Tie rods 56 extend slidably through a pair of diametrically opposed slots 62 in the second end ring 16 of the central bellows with some free play to allow relative sliding movement, as best illustrated in FIGS. 1 and 2.

Figure 4:
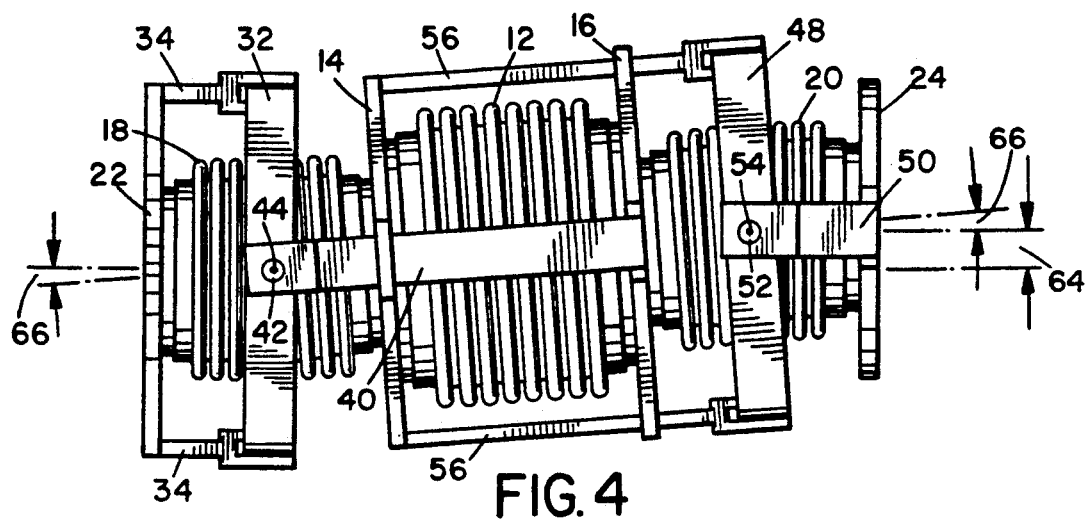
FIG. 4 is a side elevation view, on a reduced scale, showing the joint in an offset position.

With this arrangement, lateral offsets between the piping sections secured to end rings 22 and 24 can be absorbed by angulation of the end bellows, without any angulation of the central bellows. FIG. 4 illustrates one example of the operation of the joint to absorb a lateral offset. In this example, the two end rings 22 and 24 are offset by a distance 64 in a vertical direction as viewed in the drawing. This causes an angular displacement of the second tie rods 40 of the first gimbal assembly about the pivot axis 44 by an angle 66. The entire central bellows will tilt a corresponding amount, due to the tie rods 40 extending through slots 46 in end ring 14. At the same time, gimbal ring 48 pivots about axis 54 to accommodate the tilt in tie rods 56. Both end bellows become angulated, while the central bellows does not angulate but remains with its opposite ends parallel to one another.

It will be understood that lateral displacements in other directions can be absorbed in a similar manner. For example, should the end rings 22 and 24 be offset up and down as viewed in FIG. 3, this offset will be absorbed by tilting of tie rods 56 about pivot axis 60, and corresponding angulation of the gimbal ring 32 about axis 36 to accommodate tilt of tie rods 40. The end bellows will angulate in a plane perpendicular to that illustrated in FIG. 4. Offsets in directions between these two extremes will be absorbed by a combination of these rotations about both sets of pivot axes.

This provides a universal expansion joint which can absorb a total lateral offset in any direction without affecting the central balance bellows. The central balance bellows remains free to absorb any axial displacement between the end rings without transmitting loads to the piping system. The joint is pressure balanced due to the effective area of the central bellows being equal to the combined area of the two end bellows, allowing any forces developing in the joint to be offset an balanced.

Figure 5:
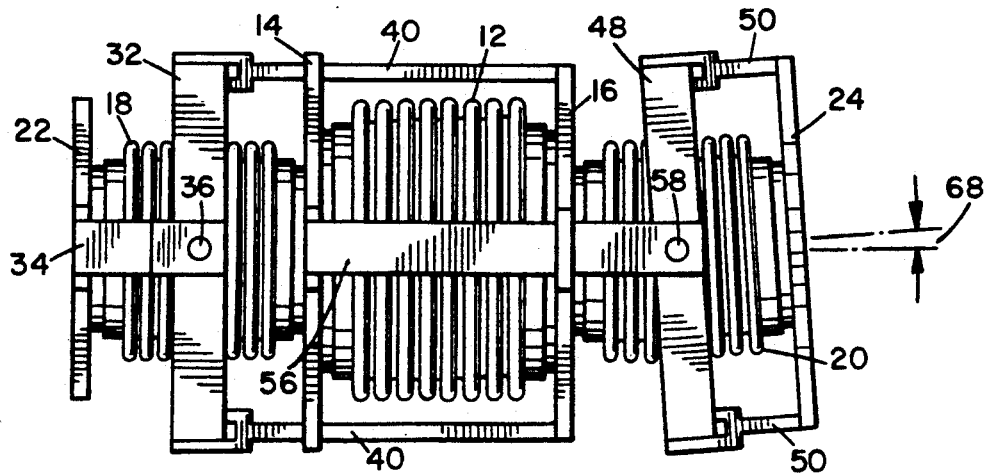
FIG. 5 is a side elevation view similar to FIG. 4 but viewed from a different direction, showing the joint in an angular offset position.

Since the end rings can rotate independently, any angulation of either end ring 22 or 24 will be imposed only on the end bellows nearest that ring. FIG. 5 illustrates tilting of end ring 24 at an angle 68. The tie rods 50 and tied gimbal ring 48 will tilt an equivalent amount about axis 58, angulating end bellows 20 only. Angulations of the end rings in any direction can be accommodated by tilting about the various pivot axes.

The pressure balanced universal expansion joint described above will allow larger amounts of axial motion and lateral offset motion about any perpendicular axes without imposing pressure thrust on the piping system. The end plates or rings of the balance bellows will not rotate when the inlet or outlet pipe experiences angular motion, since the end rings can rotate independently. The end rings of the balance bellows are held parallel and concentric to one another, avoiding angulation of the end bellows being transmitted to the central bellows and leaving the central bellows free to absorb axial motion.

Although a preferred embodiment of the present invention has been described above by way of example only, it will be understood by those skilled in the field that modifications may be made to the disclosed embodiment without departing from the scope of the invention, which is defined by the appended claims.

I claim:

1. An expansion joint for a piping system, comprising:
   a central bellows having opposite first and second ends;
   a first end bellows connected in line with the central bellows at the first end of the central bellows;
   a second end bellows connected in line with the central bellows at the second end of the central bellows;
   each end bellows having an outer end adapted for connection to a section of piping in the piping system;
   a first gimbal assembly pivotally linking the outer end of the first end bellows to the second end of the central bellows;
   a second gimbal assembly pivotally linking the outer end of the second end bellows to the first end of the central bellows; and
   each gimbal assembly comprising a gimbal ring surrounding the respective first and second end bellows, a first linkage means pivotally linking the gimbal ring to the outer end of the respective first and second end bellows, and a second linkage means pivotally linking the gimbal ring to the respective second and first end of the central bellows, the first and second linkage means having pivot axes perpendicular to each other.

2. The joint as claimed in claim 1, wherein each first linkage means comprises a pair of diametrically opposed first link members extending on opposite sides of the respective end bellows from the gimbal ring to the outer end of the respective end bellows, and each second linkage means comprises a pair of diametrically opposed second link members extending on opposite sides of the respective end bellows and the central bellows between the gimbal ring and respective end of the central bellows, the first and second link members being arranged in perpendicular planes.

3. The joint as claimed in claim 2, wherein the central bellows has a central expandable portion and enlarged first and second end rings at its opposite first and second ends, the end rings being of larger cross-sectional dimensions than the central portion of said central bellows, the first end ring having a first pair of diametrically opposed slots for slidably receiving the second link members of the first gimbal assembly, and the second end ring having a second pair of diametrically opposed slots in a plane perpendicular to said first pair of slots for slidably receiving the second link members of said second gimbal assembly.

4. The joint as claimed in claim 1, wherein the first linkage means of the first gimbal assembly and the second linkage means of the second gimbal assembly have parallel pivot axes, and the second linkage means of the first gimbal assembly and the first linkage means of the second gimbal assembly have parallel pivot axes.

5. The joint, as claimed in claim 1, wherein the first linkage means of each gimbal assembly is pivotally connected to the respective gimbal ring and rigidly secured to the outer end of the respective end bellows, and the second linkage means of each gimbal assembly is pivotally connected to the respective gimbal ring and rigidly secured to the respective end of the central bellows.

6. An expansion joint for a piping system, comprising:
   a central expandable tubular member having opposite first and second ends;
   a first expandable tubular end member connected to the first end of the central member, the first end member having an outer end adapted for connection to a pipe;
   a second expandable tubular end member connected to the second end of the central member, the second end member having an outer end adapted for connection to a pipe;
   first gimbal means for pivotally linking the outer end of the first end member to the second end of the central member, the first gimbal means having two pivot axes perpendicular to each other; and
   second gimbal means for pivotally linking the outer end of the second gimbal member to the first end of the central member, the second gimbal means having two pivot axes perpendicular to each other.

* * * * *